3,535,319
PYRIMIDINYL OR PYRAZINOYL-4-IMINO-DIHY-
DROPYRIDINE COMPOUNDS AND PROCESS
John B. Bicking, Lansdale, Pa., assignor to Merck & Co.,
Inc., Rahway, N.J., a corporation of New Jersey
No Drawing. Filed July 5, 1968, Ser. No. 742,500
Int. Cl. C07d 51/76
U.S. Cl. 260—250    14 Claims

ABSTRACT OF THE DISCLOSURE 1-(2-pyramidinyl)-4 - imino - 1,4 - dihydropyridine and by structural Formulae I and I-A for the free compounds optionaly substituted are described as hypoglycemic agents. The products are prepared by heating a reaction mixture containing 2-halopyrimidine or 2-halopyrazine and a 4-aminopyridine.

---

This invention is concerned with 4-imino-1,4-dihydropyridine compounds and their pharmacologically acceptable salts having attached to the 1-position a heterocyclic group selected from 2-pyrimidinyl and 2-pyrazinyl, as well as methods for preparing these compounds.

The new compounds of this invention can be illustrated by structural Formulae I and I-A for the free compounds and the physiologically acceptable salts thereof respectively:

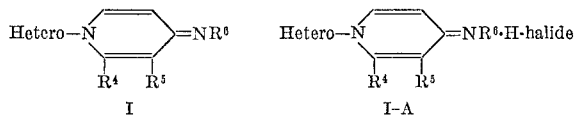

wherein the hetero substituent is selected from 2-pyrimidinyl and 2-pyrazinyl having the structures II and III below:

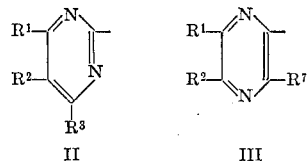

and wherein each of the variable radicals $R^1$, $R^2$, $R^4$, $R^5$ and $R^7$ separately represent hydrogen and lower alkyl and $R^3$ and $R^6$ represent hydrogen, lower alkyl and phenyl. The lower alkyl radicals advantageously have from 1 to 3 carbons and can be straight or branched chain such as methyl, ethyl, propyl and isopropyl. It is to be recognized that structural Formula I-A is representative of but one of the resonance forms of which the salts of this invention are hybrids.

The compounds of this invention can be prepared by reacting a 2-halopyrimidine or a 2-halopyrazine with the selected 4-aminopyridine. The 2-halo preferably is chloro or bromo. The reaction advantageously is carried out in the presence of a solvent such as acetonitrile, lower alcohols as methanol, ethanol, butanol and the like or in the presence of dimethylformamide and is facilitated by heating from about 60 to 130° C. for from an hour to several days depending upon the reactivity of the starting materials. The products of the invention either crystallize from the hot reaction mixture or the crystalline product can be obtained by cooling the reaction mixture and is further facilitated by the addition of ether to the cooled mixture. Alternatively, the reaction medium can be removed by evaporation or distillation and the recovered product can be purified by recrystallization advantageously from alcohol. The product is obtained in the form of its hydrohalide salt and the free base can be generated by known neutralization methods. The free base can, of course, be converted to any desired salt by addition of a selected acid to an alcoholic solution of the free base.

The compounds of this invention exhibit hypoglycemic activity and are therefore useful in lowering abnormally high blood sugar levels in warm-blooded animals. In addition, when administered orally to normal rats or guinea pigs or to rats made diabetic by prior treatment with streptozotocin, the blood sugar levels are markedly lowered. Marked lowering of the blood sugar level also is obtained by either subcutaneous or oral administration of the products of this invention to addrenalectomized animals. In each instance lowering of the blood sugar is effected at dosages that produced no gross toxic symptoms. Acute toxicity studies establish the products have a satisfactory therapeutic index. For example compound of Example 1, 1-(2-pyrimidinyl)-4-imino-1,4-dihydropyridine, which has an oral and subcutaneous $ED_{50}$ of approximately 25 mg./kg. has an acute oral $LD_{50}$ of 107 mg./kg. and acute I.V. $LD_{50}$ of 68 mg./kg. in mice. Studies with the products of this invention establish that they possess excellent oral absorption and demonstrate that they are useful in the management of hyperglycemia in warm-blooded animals.

The compounds of this invention can be administered in unit dosage forms containing from about 5 mg. to about 25 mg. per unit dosage for administration orally or parenterally, though preferably orally. Examples of suitable oral dosage forms are tablets, capsules, pills, powders, granules, wafers, etc., which can be prepared by conventional methods known to those skilled in this art.

The preparation of the compounds of this invention is described in greater detail in the following examples that are presented to illustrate the best mode known to applicant for the preparation of the novel hypoglycemic products.

EXAMPLE 1

1-(2-pyrimidinyl)-4-imino-1,4-dihydropyridine
hydrochloride

A mixture of 4-aminopyridine (14.12 g.; 0.15 mole), 2-chloropyrimidine (17.18 g.; 0.15 mole) and absolute ethanol (80 ml.) is heated under reflux, with stirring, for one hour. The mixture then is cooled to room temperature and the resulting white solid is collected and dried yielding 26.59 g. (86%) of 1-(2-pyrimidinyl)-4-imino-1,4-dihydropyridine hydrochloride, M.P. 308–309° C. (dec.). Recrystallization from methanol affords the product as white prisms, M.P. 310–312° C. (dec.).

*Analysis.*—Calcd. for $C_9H_9ClN_4$ (percent): C, 51.81; H, 4.35; N, 26.85. Found (percent): C, 51.70; H, 4.25; N, 26.97.

By replacing the 2-chloropyrimidine employed in Example 1 by an equimolecular quantity of 2-chloro-5-methylpyrimidine or by 2-chloro-4-ethylpyrimidine there is obtained, respectively, 1-(5-methyl-2-pyrimidinyl)-4-imino-1,4-dihydropyridine hydrochloride and 1-(4-ethyl-2-pyrimidinyl)-4-imino-1,4 - dihydropyridine hydrochloride.

Also, by following substantially the same procedure described in Example 1 but replacing the 4 aminopyridine employed in Example 1 by an equimolecular quantity of 4-anilinopyridine and by 2-methyl-4-aminopyridine there is obtained, respectively, 1-(2-pyrimidinyl)-4-phenylimino-1,4-dihydropyridine hydrochloride and 1-(2-pyrimidinyl) - 2 - methyl-4-imino-1,4-dihydropyridine hydrochloride.

By following the procedure described in Example 1, but employing the 2-chloropyrimidine and 4-aminopyridine reactants identified in the following table, there are obtained additional 1-(2-pyrimidinyl)-4-imino-1,4-dihydropyridine hydrochlorides having the substituents R¹, R², R³, R⁴, R⁵ and R⁶ identified in Table I.

TABLE I

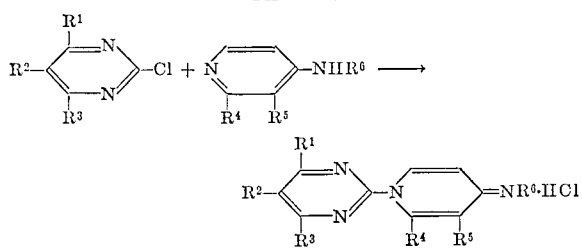

| Ex. | R¹ | R² | R³ | R⁴ | R⁵ | R⁶ | M.P., °C. (dec.) | | Analysis, percent | | |
|---|---|---|---|---|---|---|---|---|---|---|---|
| | | | | | | | | | C | H | N |
| 2 | CH₃ | H | H | H | H | H | 279–280 | Calc.: | 53.94 | 4.98 | 25.16 |
| | | | | | | | | Found: | 53.95 | 4.95 | 25.02 |
| 3 | CH₃ | H | CH₃ | H | H | H | 340 | Calc.: | 55.81 | 5.54 | 23.67 |
| | | | | | | | | Found: | 55.61 | 5.34 | 23.76 |
| 4 | H | H | H | H | H | CH₃ | 296.5–297.5 | Calc.: | 53.94 | 4.98 | 25.16 |
| | | | | | | | | Found: | 53.80 | 4.62 | 25.30 |
| 5 | CH₃ | H | H | H | H | CH₃ | 289.5–290.5 | Calc.: | 55.81 | 5.54 | 23.67 |
| | | | | | | | | Found: | 55.87 | 5.47 | 23.49 |
| 6 | CH₃ | H | C₆H₅ | H | H | H | 269.5–270.5 | Calc : | 64.32 | 5.06 | 18.75 |
| | | | C₆H₅ | | | | | Found: | 62.98 | 5.11 | ¹17.96 |
| 7 | H | H | H | H | CH₃ | H | 300–302 | Calc : | 53.94 | 4.98 | 25.16 |
| | | | | | | | | Found: | 53.73 | 5.03 | 25.27 |

¹ N.M.R. supports structure. Sample contains isopropyl alcohol of solvation.

The following examples illustrate the preparation of the 1 - (2-pyrazinyl)-4-imino-1,4-dihydropyridine hydrochloride products of this invention.

EXAMPLE 8

1-(2-pyrazinyl)-4-imino-1,4-dihydropyridine hydrochloride

A solution of 4-aminopyridine (3.8 g.; 0.04 mole) and 2-chloropyrazine (4.6 g.; 0.04 mole) in ethanol (20 ml.) is boiled under reflux for 65 hours. The solution then is chilled to cause the product to crystallize yielding, after recrystallization from ethanol, 3.6 g. (43%) of 1-(2-pyrazinyl)-4-imino-1,4 - dihydropyridine hydrochloride, M.P. 260.5–262.5° C.

*Analysis.*—Calcd. for C₉H₈N₄·HCl (percent): C, 51.80; H, 4.35; N, 26.85. Found (percent): C, 52.00; H, 4.31; N, 26.80.

By following substantially the same method described in Example 8 but replacing the 2-chloropyrazine by an equimolecular quantity of 5-methyl-2-chloropyrazine there is obtained 1-(2-methyl-2-pyrazinyl)-4-imino-1,4-dihydropyridine hydrochloride.

Additionally, by following essentially the same method described in Example 8 but replacing the 4-aminopyridine by an equimolecular quantity of 4-methylaminopyridine, 2-methyl-4-aminopyridine and by 3-methyl-4-aminopyridine there is obtained respectively 1 - (2-pyrazinyl)-4-methylimino-1,4-dihydropyridine hydrochloride, 1 - (2-pyrazinyl)-2-methyl-4-imino-1,4 - dihydropyridine hydrochloride and 1 - (2-pyrazinyl)-3-methyl-4-imino-1,4-dihydropyridine hydrochloride.

The following example describes a typical formulation for oral administration of the products of this invention. Each of the products can be formulated in the manner described below employing from about 5 to 25 mgs. of active ingredient per tablet. In the following formulation the product of Example 1, that is 1-(2-pyrimidinyl)-4-imino-1,4-dihydropyridine hydrochloride, is employed as active ingredient.

EXAMPLE 9

| | Mgs./tablet |
|---|---|
| Active ingredient | 25 |
| Corn starch | 100 |
| Talc | 14 |
| Magnesium stearate | 2 |
| Hydroxypropylmethylcellulose | 4 |
| Titanium dioxide | 4 |
| Propylene glycol | 1 |

Sufficient water is added to the starch to form a thick paste which is then intimately mixed with the active ingredient. If necessary, a small additional amount of water is added for thorough mixing of these ingredients and thereafter the water is removed by drying in an oven. After thorough drying, the material is ground, the magnesium stearate and talc are added and intimately mixed with the ground material and the mixture then is passed through a No. 10 screen and compressed into tablets. The hydroxypropylmethylcellulose and titanium dioxide are suspended in the propylene glycol and then mixed with a mixture of alcohol and chloroform (50:50) which is used as the film coating material. This mixture then is poured or sprayed into a coating pan in which the tablets are rotating thereby film coating the tablets.

Other formulations comprising more or less of active ingredient can be prepared by conventional methods for oral or parenteral administration.

What is claimed is:

1. A process for the preparation of a 1-hetero-4-imino-1,4-dihydropyridine having the structure:

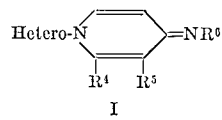

I and pharmacologically acceptable salts thereof wherein hetero is selected from structure II and III:

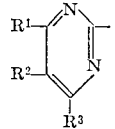 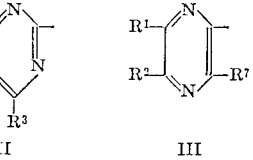

II          III wherein in each of the preceding structures R¹, R², R⁴, R⁵ and R⁷ are each separately selected from hydrogen and lower alkyl and R³ and R⁶ are each separately selected from hydrogen, lower alkyl and phenyl, which comprises heating a reaction mixture of a 2-halopyrimidine (VI) or a 2-halopyrazine (VII) and a 4-aminopyridine (VIII) having the structures given below:

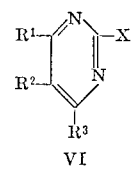 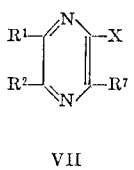 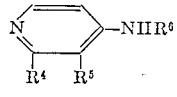

VI          VII          VIII wherein X is selected from chloro or bromo, and if desired neutralizing the product obtained to form the free base.

2. A process as claimed in claim 1, wherein the reaction mixture comprises reactants VI and VIII thereby forming a compound having the structure:

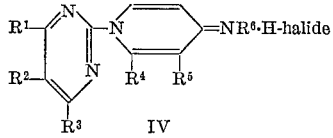

IV

3. A process as claimed in claim 2, wherein the variable radicals $R^1$, $R^2$, $R^3$, $R^4$, $R^5$ and $R^6$ are each hydrogen to give 1-(2-pyrimidinyl)-4-imino-1,4-dihydropyridine hydrohalide.

4. A process as claimed in claim 1, wherein the reactants have the structures VII and VIII to provide a compound having the structural formula:

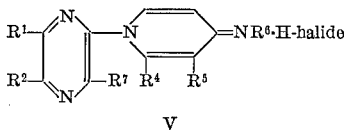

V

5. A process as claimed in claim 4, wherein the variable radicals $R^1$, $R^2$, $R^7$, $R^4$, $R^5$ and $R^6$ are each hydrogen to give 1-(2-pyrazinyl)-4-imino-1,4-dihydropyridine hydrohalide.

6. A 1-hetero-4-imino-1,4-dihydropyridine compound of the structure:

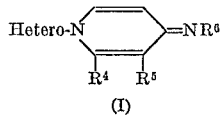

(I)

and pharmacologically acceptable salts thereof wherein hetero is selected from structures II and III:

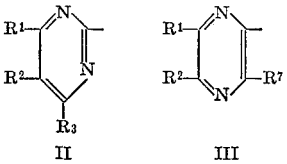

II   III wherein in each of the foregoing structures $R^1$, $R^2$, $R^4$, $R^5$ and $R^7$ are each separately selected from the group consisting of hydrogen and lower alkyl and $R^3$ and $R^6$ are each separately selected from the group consisting of hydrogen, lower alkyl and phenyl.

7. A compound of the structure:

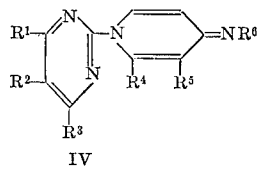

IV and pharmacologically acceptable salts thereof wherein $R^1$, $R^2$, $R^3$, $R^4$, $R^5$ and $R^6$ have the meanings assigned in claim 6.

8. A compound as claimed in claim 7, wherein each of the variable radicals $R^1$, $R^2$, $R^3$, $R^4$, $R^5$ and $R^6$ are each hydrogen.

9. A compound as claimed in claim 7, wherein $R^1$ is methyl and each of the variable radicals $R^2$, $R^4$, $R^5$ and $R^6$ are each hydrogen, and $R^3$ is selected from hydrogen and methyl.

10. A compound as claimed in claim 7, wherein $R^1$ is selected from hydrogen and methyl, $R^2$, $R^3$, $R^4$ and $R^5$ are each hydrogen and $R^6$ is methyl.

11. A compound as claimed in claim 7, wherein $R^1$ is methyl, $R^2$, $R^4$, $R^5$ and $R^6$ are each hydrogen and $R^3$ is phenyl.

12. A compound as claimed in claim 7, wherein $R^1$, $R^2$, $R^3$, $R^5$ and $R^6$ are each hydrogen and $R^4$ is methyl.

13. A compound as claimed in claim 6, having the structural formula

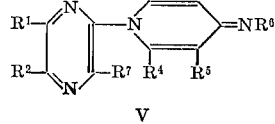

V and pharmacologically acceptable salts thereof wherein $R^1$, $R^2$, $R^7$, $R^4$, $R^5$ and $R^6$ have the meaning assigned in claim 6.

14. A product as claimed in claim 13, wherein $R^1$, $R^2$, $R^7$, $R^4$, $R^5$ and $R^6$ are each hydrogen.

References Cited
UNITED STATES PATENTS 3,346,452  10/1967  Carney et al. _____ 260—250

NICHOLAS S. RIZZO, Primary Examiner

U.S. Cl. X.R.

424—250

UNITED STATES PATENT OFFICE
CERTIFICATE OF CORRECTION

Patent No. 3,535,319   Dated  October 20, 1970

Inventor(s) John B. Bicking

It is certified that error appears in the above-identified patent and that said Letters Patent are hereby corrected as shown below:

In column 1, line 13, delete the entire line and add the following:  --1-(2-pyrazinyl)-4-imino-1,4-dihydropyridine compounds--. In column 3, Example 6, in the column headed "$R^3$", change "$C_6H_6$" to read --$C_6H_5$-- and then delete the second occurrence of "$C_6H_5$"; line 48, change "1-(2-methyl" to read --1-(5-methyl--.

SIGNED AND SEALED

JAN 5 1971

SEAL
Attest:

Edward M. Fletcher, Jr.
Attesting Officer

WILLIAM E. SCHUYLER, JR.
Commissioner of Patents